United States Patent
Sakamori (10) Patent No.: US 12,284,143 B2
(45) Date of Patent: Apr. 22, 2025

(54) CHATBOT SYSTEM, OPTION FORMATION DEVICE, OPTION FORMATION METHOD, AND NON-TRANSITORY COMPUTER-READABLE MEDIUM

(71) Applicant: NEC Corporation, Tokyo (JP)

(72) Inventor: Yasuhiro Sakamori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/909,804

(22) PCT Filed: Mar. 30, 2020

(86) PCT No.: PCT/JP2020/014651
§ 371 (c)(1),
(2) Date: Sep. 7, 2022

(87) PCT Pub. No.: WO2021/199198
PCT Pub. Date: Oct. 7, 2021

(65) Prior Publication Data
US 2024/0214331 A1    Jun. 27, 2024

(51) Int. Cl.
*H04L 51/02*    (2022.01)
*G06F 16/28*    (2019.01)

(52) U.S. Cl.
CPC ............ *H04L 51/02* (2013.01); *G06F 16/285* (2019.01)

(58) Field of Classification Search
CPC ......... H04L 51/02; G06F 16/285; G06F 16/90
See application file for complete search history.

(56) References Cited

U.S. PATENT DOCUMENTS

| | | | |
|---|---|---|---|
| 2017/0243107 A1* | 8/2017 | Jolley | G06N 5/02 |
| 2019/0044829 A1* | 2/2019 | Balzer | H04L 51/214 |
| 2019/0228335 A1* | 7/2019 | Suzuki | G06F 16/3344 |
| 2021/0049210 A1 | 2/2021 | Otsuka et al. | |
| 2021/0279232 A1 | 9/2021 | Kim | |

FOREIGN PATENT DOCUMENTS

| | | |
|---|---|---|
| JP | 2019-079437 A | 5/2019 |
| JP | 2019-139574 A | 8/2019 |
| JP | 2019-185614 A | 10/2019 |
| JP | 2020-013514 A | 1/2020 |

OTHER PUBLICATIONS

JP Office Communication for JP Application No. 2022-512932, mailed on Oct. 17, 2023 with English Translation.
International Search Report for PCT Application No. PCT/JP2020/014651, mailed on Jun. 23, 2020.

* cited by examiner

*Primary Examiner* — Soe Hlaing (57) ABSTRACT

A purpose of the present invention is to provide a chatbot system, an option formation device, an option formation method, and a non-transitory computer-readable medium that are capable of displaying suitable options at the top and making dialogue more efficient. A chatbot system (100) includes at least one memory configured to store an instruction, and at least one processor configured to execute the instruction, the processor being further configured to receive data on an inquiry from a user terminal, create options for a response to inquiry contents of the inquiry, sort the options in accordance with an order of priority, and transmit data for displaying the options in the order of priority to the user terminal.

9 Claims, 12 Drawing Sheets

```
SELECT MEANS OF TRANSPORTATION FROM TOKYO TO OSAKA

├── BULLET TRAIN

├── AIRPLANE

├── NIGHT BUS

└── OTHERS
```

SELECTION BEHAVIOR TABLE

| NOS. (NUMERICAL TYPE) | INQUIRY SENTENCES (CHARACTER STRING) | OPTIONS (CHARACTER STRING) | SELECTED OPTIONS |
|---|---|---|---|
| | INQUIRY SENTENCE 1 | OPTION 1, OPTION 2, OPTION 4 | OPTION 1 |
| | INQUIRY SENTENCE 2 | OPTION 1, OPTION 3, OPTION 4 | OPTION 4 |
| | | | |

SELECTION BEHAVIOR TABLE

| NOS. (NUMERICAL TYPE) | INQUIRY SENTENCES (CHARACTER STRING) | OPTIONS (CHARACTER STRING) | OPTIONS (json TYPE) | NUMBER OF SELECTIONS (NUMERICAL TYPE) |
|---|---|---|---|---|
| | GROUP OF INQUIRY SENTENCE | OPTION 1, OPTION 2, OPTION 4 | [{ "OPTION 1":1, "OPTION 2":3, "OPTION 4":2 }] | 6 |
| | | OPTION 1, OPTION 3, OPTION 4 | [{ "OPTION 1":1, "OPTION 3":6, "OPTION 4":1 }] | 8 |
| | | | | |

INPUT OPTIONS:
OPTION1  OPTION2  OPTION4

INFORMATION IN BEHAVIOR SELECTION DB

| | OPTION | OPTION 1 | OPTION 2 | OPTION 3 | |
|---|---|---|---|---|---|
| ① | NUMBER OF SELECTIONS | 1 | 2 | 2 | |
| ② | OPTION | OPTION 1 | | OPTION 3 | |
| | NUMBER OF SELECTIONS | 1 | | 1 | |
| ③ | OPTION | OPTION 1 | | OPTION 3 | OPTION 4 |
| | NUMBER OF SELECTIONS | 1 | | 2 | 1 |

RATE OF EACH OPTION IN ①     1/5    2/5    2/5
RATE OF EACH OPTION IN ②     1/2    1/2
RATE OF EACH OPTION IN ③     1/4           2/4    1/4
SIMPLE ADDITION              19/20  2/5    7/5    1/4
MULTIPLICATION BY RATE       57/220 4/55   35/55  1/44
OF NUMBER OF SELECTIONS

| ORDER OF PRIORITY | 2 | 3 | 1 | 4 |

RATE OF EACH OPTION
OPTION 1  OPTION 2  OPTION 3  OPTION 1
3/11      2/11      5/11      1/11

DETERMINATION OF PRIORITY

NUMBER OF SELECTIONS OF EACH OPTION

| OPTION 1 | OPTION 2 | | OPTION 4 |
|---|---|---|---|
| 3 | 2 | | 1 |

SELECTION RATE OF EACH OPTION

| 3/6 | 2/6 | | 1/6 |

FOR THREE OPTIONS, IF RATE IS LOWER THAN 1/6, PRIORITY IS SET "LOW"

NO "LOW" PRIORITY IN ABOVE CASE

```
SELECT MEANS OF TRANSPORTATION FROM TOKYO TO OSAKA
        ├── BULLET TRAIN
        ├── NIGHT BUS
        ┼── OTHERS
```

Fig. 14

```
SELECT YOUR PREFERRED CUISINE
        ├── CHINESE
        ├── JAPANESE
        ├── ITALIAN
        ┼── OTHERS
```

CHATBOT SYSTEM, OPTION FORMATION DEVICE, OPTION FORMATION METHOD, AND NON-TRANSITORY COMPUTER-READABLE MEDIUM

This application is a National Stage Entry of PCT/JP2020/014651 filed on Mar. 30, 2020, the contents of all of which are incorporated herein by reference, in their entirety.

TECHNICAL FIELD

The present invention relates to a chatbot system, an option formation device, an option formation method, and a non-transitory computer-readable medium.

BACKGROUND ART

The use of Artificial Intelligence (AI) chatbots, which can automatically provide appropriate response information to users' inquiries using artificial intelligence technology, is expanding. Such AI chatbots can provide appropriate response information to a wide variety of inquiries from users without human intervention.

For example, Patent Literature 1 discloses a chatbot system that evaluates the reliability of an AI chatbot server device by analyzing the text of chats contained in log information.

In such an AI chatbot, when executing a dialogue scenario automatically generated by the logical thinking AI, the AI chatbot is optimized by eliminating options that do not match input inquiries or the like.

CITATION LIST

Patent Literature

Patent Literature 1: Japanese Unexamined Patent Application Publication No. 2019-185614

SUMMARY OF INVENTION

Technical Problem

However, there is a problem that suitable options are not always displayed at the top of a list, because the order of priority or priorities of presented options is not verified. This causes further problems in the visibility and convenience of the options and forces inefficiency in the selection behavior of a user.

Solution to Problem

A chatbot system according to an example embodiment includes at least one memory configured to store an instruction, and at least one processor configured to execute the instruction, the processor being further configured to receive data on an inquiry from a user terminal, create options for a response to inquiry contents of the inquiry, sort the options in accordance with an order of priority, and transmit data for displaying the options in the order of priority to the user terminal.

An option formation device according to an example embodiment includes at least one memory configured to store an instruction, and at least one processor configured to execute the instruction, the processor being further configured to record an order of priority of options for each inquiry contents in a selection behavior database, refer to the selection behavior database to determine a priority of each of the options, and sort the options based on a determination result regarding the priority.

An option formation method according to an example embodiment includes referring to a selection behavior database to determine, for options for a response to an inquiry sent to a chatbot, an order of priority of each of the options, sorting the options based on a determination result regarding the order of priority, and returning the sorted options to the chatbot.

A non-transitory computer-readable medium according to an example embodiment stores a program for causing a computer to execute a step of referring to a selection behavior database to determine, for options for a response to an inquiry sent to a chatbot, an order of priority of each of the options, a step of sorting the options based on a determination result regarding the order of priority, and a step of returning the sorted options to the chatbot.

Advantageous Effects of Invention

According to the present invention, it is possible to provide a chatbot system, an option formation device, an option formation method, and a non-transitory computer-readable medium that are capable of displaying suitable options at the top and making dialogue more efficient.

BRIEF DESCRIPTION OF DRAWINGS

FIG. 11 is a diagram showing an example of priority determination by the option formation unit according to the first example embodiment;

EXAMPLE EMBODIMENT

First Example Embodiment

Figure 1:
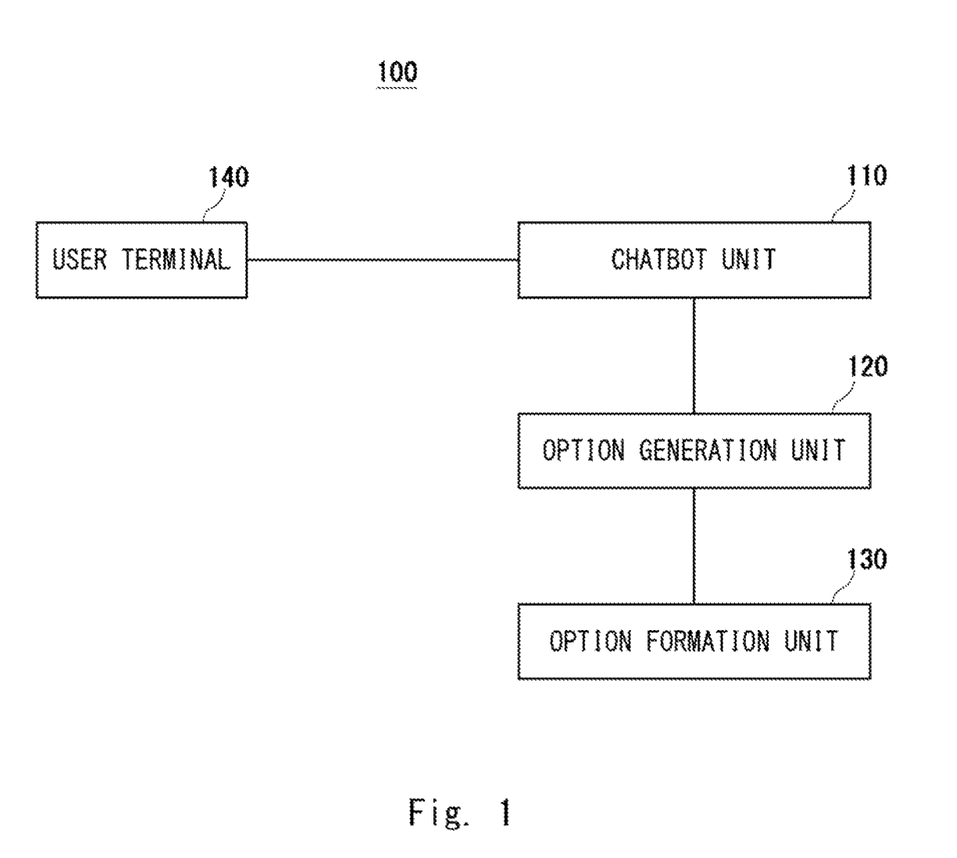
FIG. 1 is a block diagram showing a configuration of a chatbot system according to a first example embodiment.

Hereinafter, example embodiments of the present invention will be described with reference to the drawings. FIG. 1 is a block diagram showing a configuration of a chatbot system according to a first example embodiment. In FIG. 1, a chatbot system 100 includes a chatbot unit 110, an option generation unit 120, and an option formation unit 130.

The chatbot unit 110, the option generation unit 120, and the option formation unit 130 may be provided collectively in the same device. Alternatively, the chatbot unit 110, the option generation unit 120, and the option formation unit 130 may be separate devices and connected to each other via a network. In addition, the chatbot unit 110, the option generation unit 120, and the option formation unit 130 may be equipped with some functions in a cloud server or cloud storage. In addition, the configuration of each of the chatbot unit 110, the option generation unit 120, and the option formation unit 130 may be implemented by a plurality of devices (for example, a plurality of servers). Therefore, the chatbot unit 110, the option generation unit 120, and the option formation unit 130 are not required to be provided on the same physical server and can be distributed by module. For this reason, it is possible to scale out (increase the number of servers) and expand only the modules with increased load, such as AI or database only.

The chatbot unit 110, the option generation unit 120, and the option formation unit 130 may be implemented by a computer including a CPU and a memory, and a program to be executed on the computer. The chatbot unit 110, the option generation unit 120, and the option formation unit 130 may be implemented by hardware using electronic circuits.

The chatbot unit 110 includes an interface that can receive data transmitted from a user terminal 140. Then, the chatbot unit 110 transmits this data to the option generation unit 120. The data to be transmitted from the user terminal 140 may be in any format as long as it is data regarding an inquiry. For example, the data to be transmitted from the user terminal 140 is text data. Alternatively, the data to be transmitted from the user terminal 140 may be voice data. For example, if the data regarding an inquiry is voice data, the chatbot unit 110 converts it to text data using a voice recognition circuit (or a program).

The option generation unit 120 generates return text (questions in return) and options associated with the return text based on the input content of the inquiry transmitted from the chatbot unit 110. To the option generation unit 120, any AI that can respond to the inquiry content is applicable. For example, the option generation unit 120 may be logical thinking AI. The logical thinking AI is AI with a mechanism to automatically compose scenarios (information that defines questions in return to user input) for dialogue in an interactive chatbot, based on information extracted from WorldWideWeb pages, texts, and Portable Document Format (PDF) manuals.

The option formation unit 130 receives data on the options from the option generation unit 120. Then, the option formation unit 130 determines priority by comparing it with accumulated behavior data and sorts the options according to the priority. Then, the option formation unit 130 transmits data on the sorted options (directly or via the option generation unit 120) to the chatbot unit 110.

Note that the user terminal 140 is not limited to one and may be a plurality of user terminals. For example, the chatbot unit 110 may have agents corresponding to the number of user terminals. Note that an agent is software that operates in an intermediary relation with users and other software. That is, the chatbot unit 110 may include agents corresponding to respective user terminals.

With the above configuration, the chatbot system 100 includes the chatbot unit 110 that serves as an interface with a user, the option generation unit 120 that interacts with the user via the chatbot unit 110, and the option formation unit 130 that optimizes options generated by the logical thinking AI. The chatbot unit 110 and the option generation unit 120 may be connected via a network. The option generation unit 120 and the option formation unit 130 may also be connected via a network.

Figure 2:
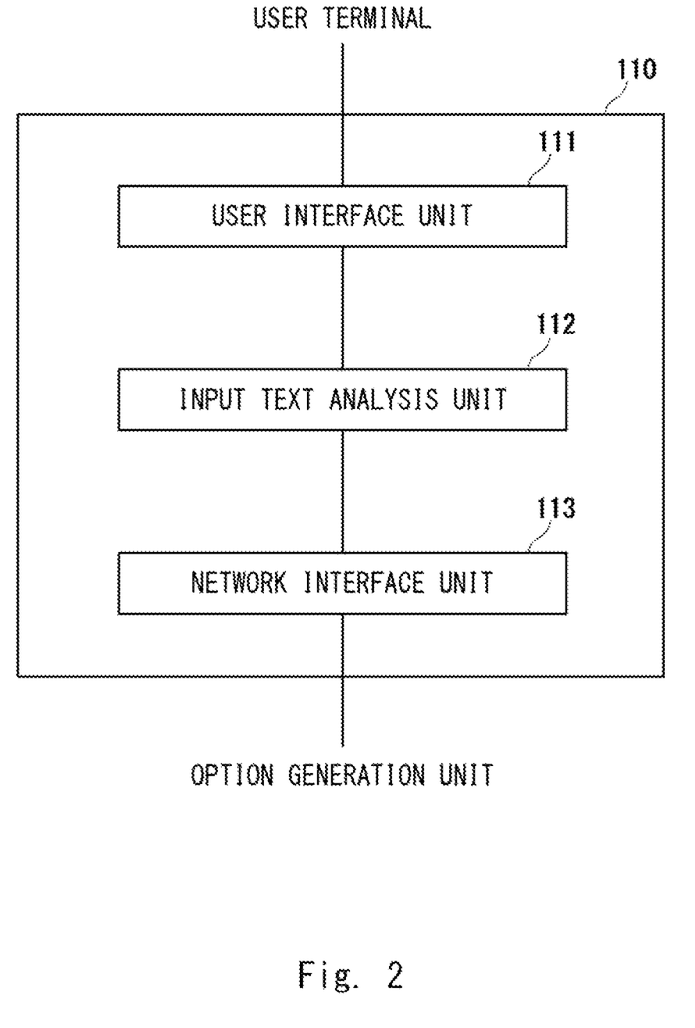
FIG. 2 is a block diagram showing a detailed configuration of a chatbot unit according to the first example embodiment.

Next, the detailed configuration of the chatbot unit 110 is described. FIG. 2 is a block diagram showing the detailed configuration of the chatbot unit according to the first example embodiment. In FIG. 2, the chatbot unit 110 includes a user interface unit 111, an input text analysis unit 112, and a network interface unit 113.

The user interface unit 111 is a user interface that exchanges data with the user terminal 140. For example, the user interface unit 111 includes a network circuit that can transmit and receive data to and from the user terminal.

The input text analysis unit 112 analyzes text data from the user terminal 140 and recognizes the inquiry content. Then, the input text analysis unit 112 transmits the inquiry content to the option generation unit 120 via the network interface unit 113.

The network interface unit 113 is a network interface that exchanges data with the option generation unit 120. For example, the network interface unit 113 includes a network circuit that can transmit and receive data to and from the option generation unit 120.

Figure 3:
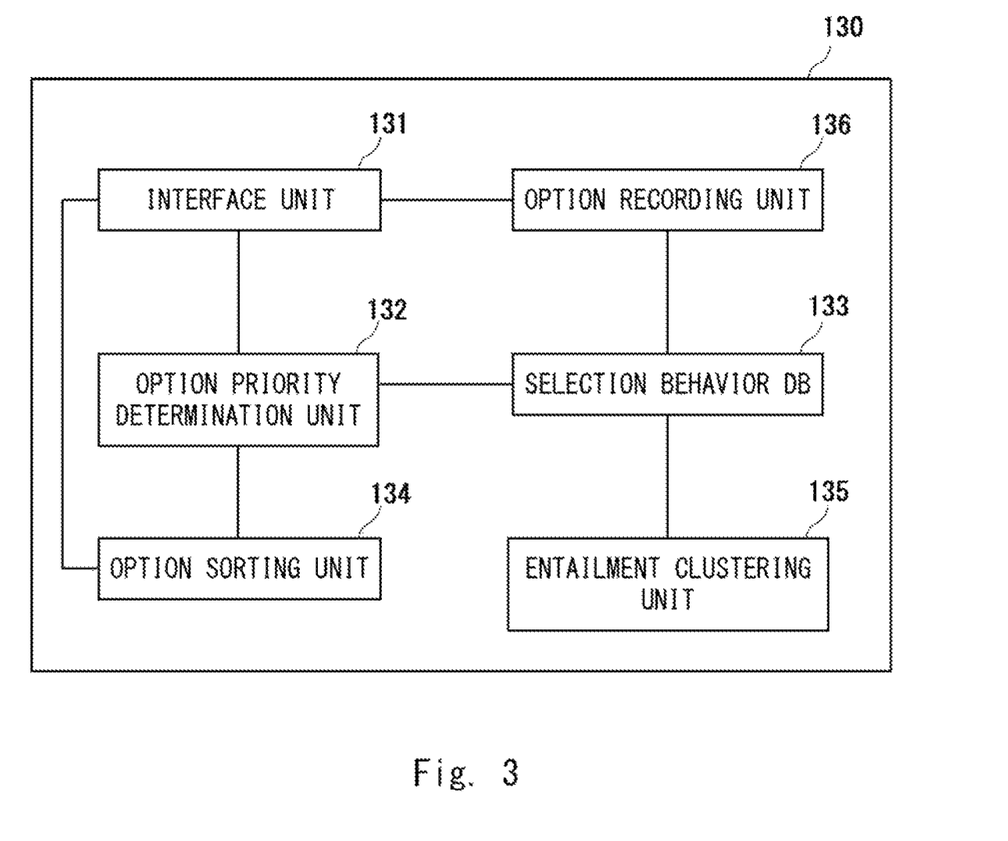
FIG. 3 is a block diagram showing a detailed configuration of an option formation unit according to the first example embodiment.

Next, the detailed configuration of the option formation unit 130 is described. FIG. 3 is a block diagram showing the detailed configuration of the option formation unit according to the first example embodiment. In FIG. 3, the option formation unit 130 includes an interface unit 131, an option priority determination unit 132, a selection behavior DB 133, an option sorting unit 134, and an entailment clustering unit 135.

The interface unit 131 is a network interface that exchanges data with the option generation unit 120. For example, the interface unit 131 includes a network circuit that can transmit and receive data to and from the option generation unit 120. The option priority determination unit 132 transmits combinations of options and their priorities to the option sorting unit 134.

The option priority determination unit 132 refers to the selection behavior DB 133 to read the order of priority of the data on each option transmitted from the option generation unit 120.

The selection behavior DB 133 is a database that stores the options in association with the priorities. For example, the selection behavior DB 133 stores a selection behavior aggregation table in which an option is associated with the number of times the option is selected. For example, the order of priority of an option is determined based on the number of times the option is selected.

The option sorting unit 134 sorts options in accordance with an order of priority. Then, the option sorting unit 134 transmits the sorted options to the chatbot unit 110 via the interface unit 131.

The entailment clustering unit 135 groups phrases with similar meanings in the selection behavior DB 133. Specifically, the content of the selection behavior aggregation table of the selection behavior DB 133 is data obtained by aggregating periodically (daily, weekly, or monthly) the inquiries in a selection behavior table by entailment clustering (a technique of grouping phrases with similar meanings). Entailment clustering is to quickly and automatically group document data without setting classification in advance using a textual entailment recognition technique to determine whether two sentences contain the same meaning. For example, the entailment clustering unit 135 groups, for each inquiry sentence with similar meanings, multiple inquiry sentences using the entailment clustering technique at regular intervals.

The option recording unit 136 reflects the information on the option selected on the user terminal in the selection behavior DB 133 for each inquiry content.

Figure 4:
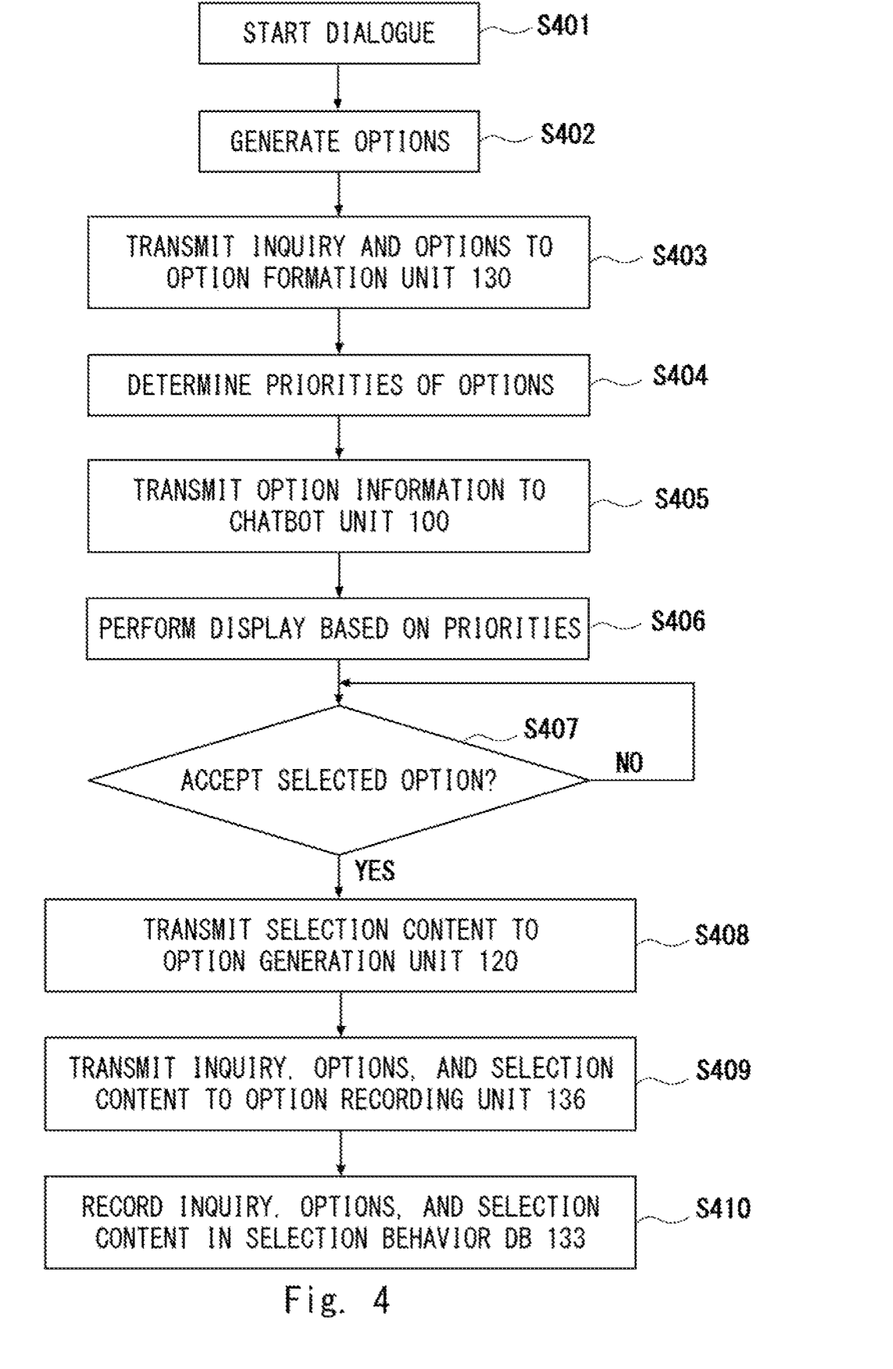
FIG. 4 is a flowchart showing an example of an operation of the chatbot system according to the first example embodiment.

Next, the operation of the chatbot system 100 is described. FIG. 4 is a flowchart showing an example of the operation of the chatbot system according to the first example embodiment.

First, in step S401, a user uses the user terminal 140 to start a dialogue with the option generation unit 120 via the chatbot unit 110. Then, the processing proceeds to step S402.

Then, in step S402, the option generation unit 120 generates options according to the content of the dialogue. Then, the processing proceeds to step S403.

Then, in step S403, the option generation unit 120 transmits the inquiry and the generated options to the option formation unit 130. Then, the processing proceeds to step S404.

In step S404, the option formation unit 130 refers to the selection behavior DB 133 based on the inquiry and the received options to determine the order of priority of the options. Then, the option formation unit 130 returns the order of priority of the options to the option generation unit 120. Here, the priority determination of the options is performed based on the user's accumulated selection behavior when the same or similar inquiries and options were presented in the past, and the options that are more likely to be selected this time are determined as high priority options. Then, the processing proceeds to step S405.

In step S405, the option generation unit 120 transmits information on the options to the chatbot unit 110. Then, the processing proceeds to step S406.

In step S406, the chatbot unit 100 returns, to the user terminal 140, data that is divided into those to be displayed at the top, those to be displayed at the bottom, and those are initially collapsed to be displayed based on the options and their priorities. The specific display content is described later. Then, the processing proceeds to step S407.

In step S407, the chatbot unit 100 accepts the option selected by the user. When the chatbot unit 100 does not receive the option selected by the user, the processing repeats step S407. When the chatbot unit 100 accepts the option selected by the user, the processing proceeds to step S408.

In step S408, the chatbot unit 110 transmits the selection content to the option generation unit 120. Then, the processing proceeds to step S409.

In step S409, the option generation unit 120 transmits the inquiry, the options, and the selection content to the option recording unit 136 via the interface unit 131. Then, the processing proceeds to step S410.

In step S410, the option recording unit 136 records the inquiry, the options, and the selection content in the selection behavior DB 133. Until the selection behavior is accumulated, all the options are processed as high priority options in the order in which the options are generated. Then, the processing is terminated.

Figure 5:
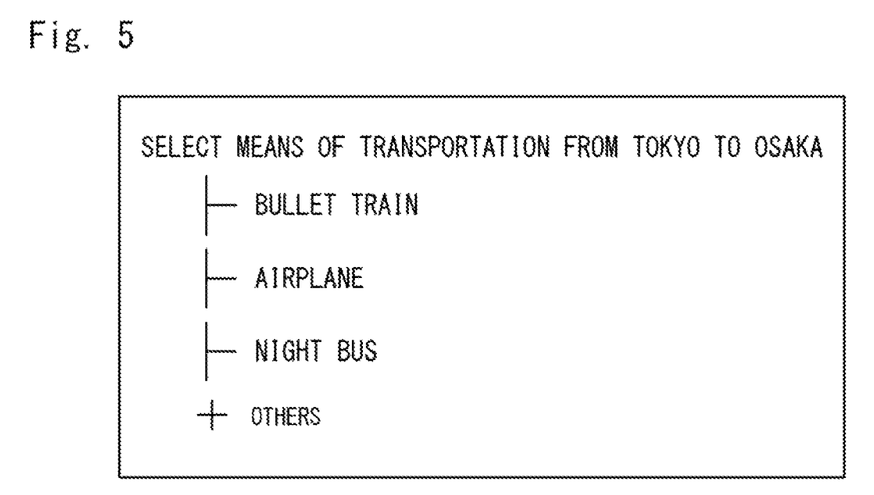
FIG. 5 is a diagram showing a display example in the chatbot system according to the first example embodiment.

Next, a display example of a response to an inquiry is described. FIG. 5 is a diagram showing a display example in the chatbot system according to the first example embodiment. FIG. 5 shows an example of displaying an inquiry about "How to get from Tokyo to Osaka" and the response to it.

In FIG. 5, three options are displayed in response to the inquiry about "How to get from Tokyo to Osaka". The top option "Bullet train" is the option determined to have the highest priority. The second option from the top "Airplane" is the option determined to have the next highest priority after "Bullet train". The third option from the top "Night Bus" is the option determined to have the next highest priority after "Airplane".

Options other than the top three options are omitted as "Others" (so-called a collapsed display format). This "Others" indication may be displayed in, for example, a smaller font than the top three options. In other words, the font size can be used to express the degree of priority. In FIG. 5, the top three options are displayed in the same font size, but the font size of the option with higher priority may be larger than that of the option with lower priority. The difference in priority is not limited to the font size. For example, the difference in priority may be expressed in at least one of the following manners of changing the font weight, changing the font color, changing the font, changing the background color, and displaying either the high or low priority option with a pop-up window. In the case of a voice chatbot, the difference in priority may be expressed in at least one of the following manners of playing the voice of responses in the sorted order, playing only the three options with higher priority at first, and playing other options further in response to an inquiry of the user.

Figure 6:
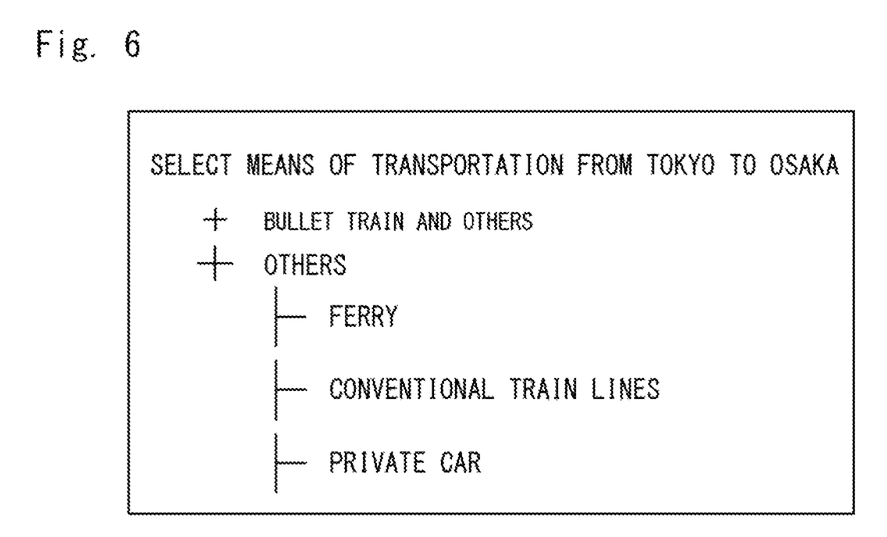
FIG. 6 is a diagram showing a display example in the chatbot system according to the first example embodiment.

In the example in FIG. 5, by selecting the "Others" option, options other than the top three specifically displayed options "Bullet train", "Airplane", and "Night Bus" are displayed. FIG. 6 shows a display example in the chatbot system according to the first example embodiment. In FIG. 6, options other than the top three options are displayed.

In FIG. 6, the options "Ferry", "Conventional train lines", and "Private car", which are determined to have the next highest priorities after the top three options, are displayed in order from the top. In addition, the indication "Bullet train and others" is displayed above "Ferry" to redisplay the top three options. This "Bullet train and others" indication may be displayed in, for example, a smaller font than the options "Ferry", "Conventional train lines", and "Private car". As in FIG. 5, for the options "Ferry", "Conventional train lines", and "Private car", the font size of the option with higher priority may be larger than that of the option with lower priority.

Figure 7:
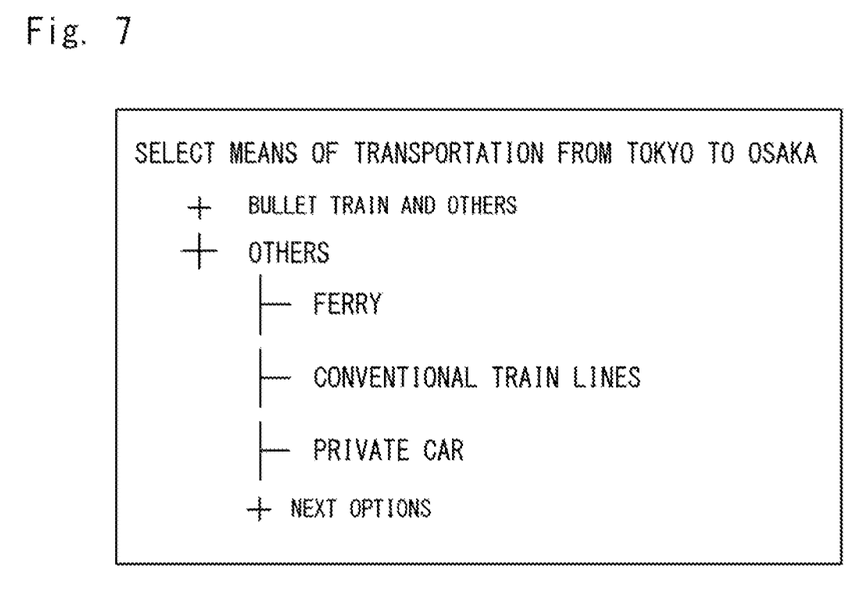
FIG. 7 is a diagram showing a display example in the chatbot system according to the first example embodiment.

FIGS. 5 and 6 show examples of displaying three options at a time when there are six options, but the case where there are seven or more options is described below. FIG. 7 is a diagram showing a display example in the chatbot system according to the first example embodiment.

FIG. 7 shows an example of the display by selecting the "Others" option from FIG. 5. In FIG. 7, a "Next options" indication is displayed under the sixth option "Private car" in addition to the same display content as in FIG. 6. By selecting this "Next options", options other than the top six specifically displayed options are displayed. The "Next options" indication may be displayed in, for example, a smaller font than the other options.

Figure 8:
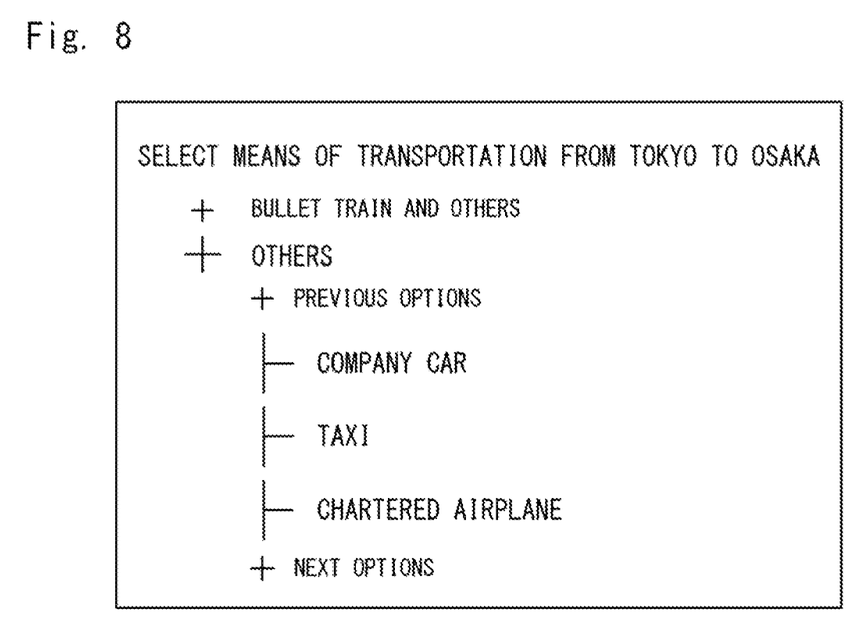
FIG. 8 is a diagram showing a display example in the chatbot system according to the first example embodiment.

FIG. 8 is a diagram showing a display example in the chatbot system according to the first example embodiment. FIG. 8 is an example of the display when "Next options" is selected in the display example shown in FIG. 7. In FIG. 8, the options "Company car", "Taxi", and "Chartered airplane", which are determined to have the next highest priorities after the top six options, are displayed in order from the top. A "Previous options" indication is displayed above the option "Company car" to redisplay the fourth to sixth highest priority options. In addition, the "Others" indication is displayed thereabove. In addition, the "Bullet train and others" indication is displayed to redisplay the top three options.

These "Previous options" and "Bullet train and others" indications may be displayed in, for example, a smaller font than the options "Company car", "Taxi", and "Chartered airplane". As in FIG. 5, for the options "Company car", "Taxi", and "Chartered airplane", the font size of the option with higher priority may be larger than that of the option with lower priority. In addition, the "Next options" indication is displayed at the bottom to select lower priority options, as in FIG. 7.

These displays are based on the priorities determined by the option formation unit 130, and the chatbot unit 110 creates data specifying the display size of the options together with the data on the options and the order of priority of the options. Then, these displays are realized by transmitting the data specifying the display size of the options together with the data on the options and the order of priority of the options from the chatbot unit 110 to the user terminal 140.

In the examples in FIGS. 5 to 7, three options are displayed at a time in accordance with an order of priority, but the number of options to be displayed simultaneously is not limited to three and may be determined arbitrarily according to the display capability of the user terminal or the user's settings.

Figure 9:
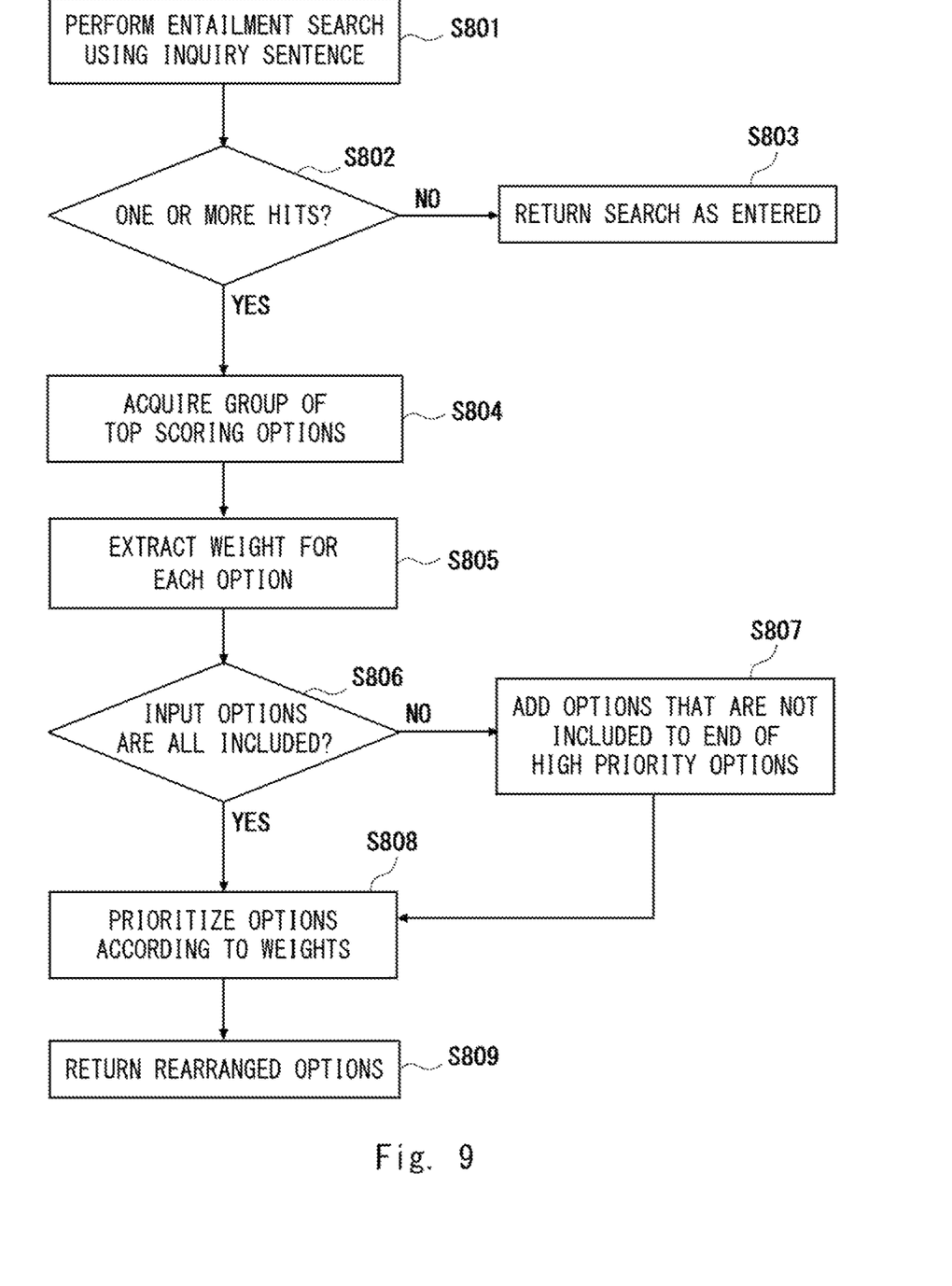
FIG. 9 is a flowchart showing an example of an operation of the chatbot system according to the first example embodiment.

Next, the operation of the option formation unit 130 is described. FIG. 9 is a flowchart showing an example of the operation of the chatbot system according to the first example embodiment.

In step S801, an entailment search (a technique to search for sentences with similar meanings) is performed by an inquiry unit. For example, an entailment search is performed by the inquiry unit on inquiry sentences in the selection behavior aggregation table. Then, the processing proceeds to step S802.

In step S802, it is determined whether the entailment search results in one or more hits. When the entailment search does not result in one or more hits, the processing proceeds to step S803. When the entailment search results in one or more hits, the processing proceeds to step S804.

In step S803, the search is returned as entered, and the processing is terminated. All priorities are set to high.

In step S804, a group of top scoring options (for example, the top three options) is acquired from the hits of inquiries, and the processing proceeds to S805.

In step S805, weights are calculated for the options. Then, the processing proceeds to step S806.

In step S806, it is determined whether the input options are all included in the processing of step S806. When the input options are not all included in the processing of step S806, the processing proceeds to step S807. When the input options are all included in the processing of step S806, the processing proceeds to step S808.

In step S807, options that are not included in the processing of step S806 are added to the end of the high priority options. Then, the process proceeds to step S808.

In step S808, the options are prioritized (that is, sorted) according to their weights. Then, the processing proceeds to step S809.

In step S809, the rearranged options are returned to the option generation unit 120, and the processing is terminated.

Through the above operation, the passed options are compared with the selection behavior data (selection behavior aggregation table) using the entailment search, and the order of priority of the respective options are determined. Then, by sorting the options according to the priorities, a new arrangement of options is generated.

Figure 10:
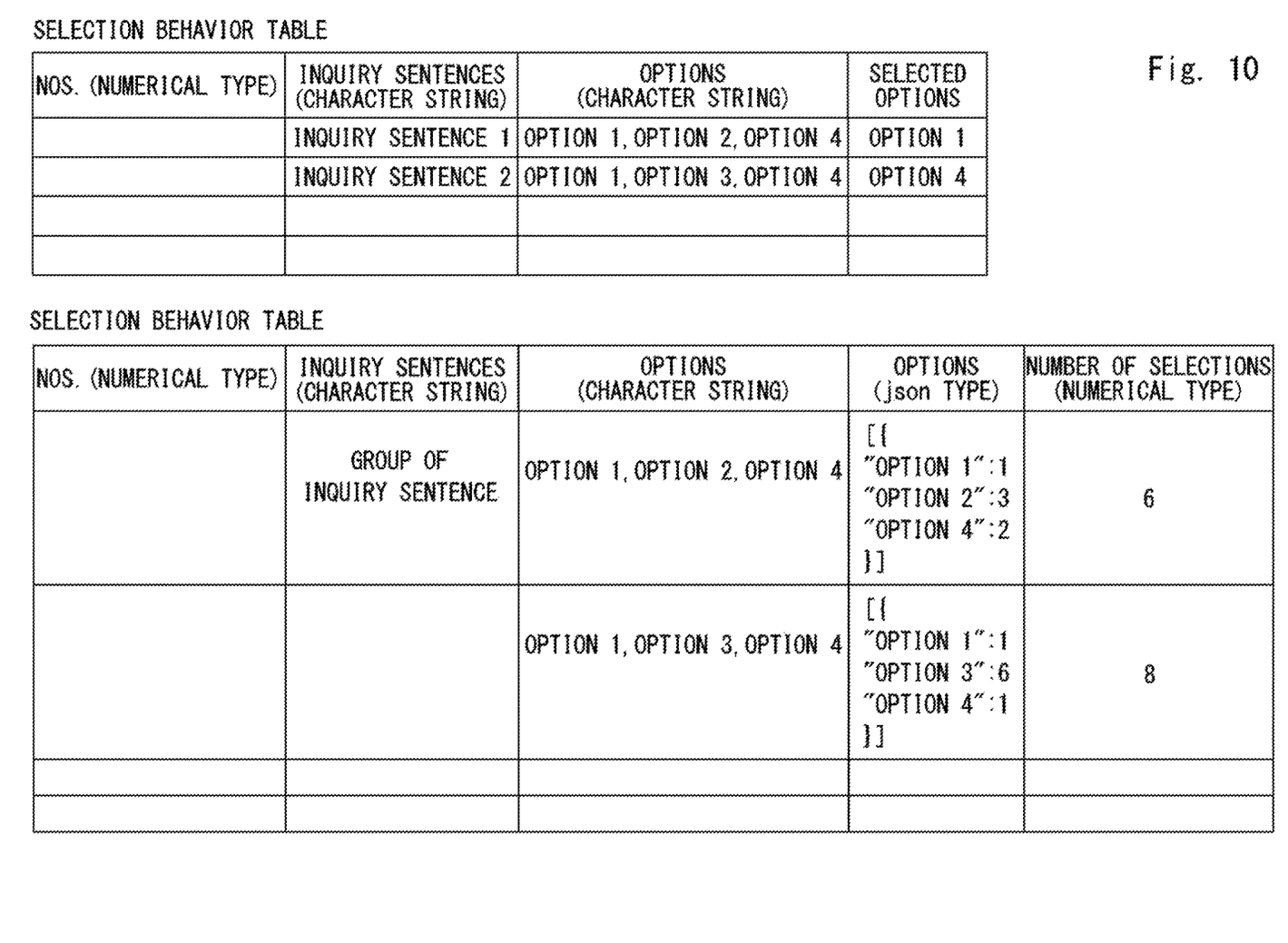
FIG. 10 is a diagram showing a selection behavior table of the option formation unit according to the first example embodiment.

Next, the method of determining priorities is described. FIG. 10 is a diagram showing the selection behavior table of the option formation unit 130 according to the first example embodiment. As shown in the upper part of FIG. 10, the selection behavior table includes columns for Nos. (numerical type), inquiry sentences (character string), options (character string), and selected options. Note that, the selected options are those that have been selected by the user for the same or similar inquiry sentences in the past.

The priorities are determined by first setting the selected options to higher priorities. The remaining options are then set to lower priorities than the selected options. The priority is set for each inquiry sentence.

In the example in FIG. 10, Options 1, 2, and 4 are selected by the option generation unit 120 as a response to Inquiry 1. These options are transmitted from the option generation unit 120 to the option formation unit 130.

Then, Option 1 is set to the highest priority option. Options 2 and 4 are lower priority options than Option 1 for Inquiry 1. Then, the Options 1, 2, and 4 rearranged according to the order of priority are returned from the option formation unit 130 to the option generation unit 120.

The priorities may also be determined based on the number of times the respective options are selected. In this case, as shown in the lower part of FIG. 10, the selection behavior aggregation table may have columns for Nos. (numeric type), inquiry sentences (character string), options (character string), options (json type), and the number of selections (numeric type).

The priorities are then determined based on the following criteria.

If there is a combination that is the same as a group of input options, the order of priority is to be set in the order of the number of selections in the combination. In this case, the rank is set low if the number of times each option is selected out of the total number of selections is less than half of an expected value.

Example: If there are four options, an option that is selected less than one out of every eight times is ranked low.

The case where there is no combination that is the same as a group of input options is described with reference to FIG. 11. FIG. 11 shows an example of priority determination by the option formation unit according to the first example embodiment.

All groups of options that include the first input option are extracted. The selection rate of each option in each group is calculated, and the rates for each option are simply added.

The value obtained by multiplying the simple addition value by the selection rate of each option to the total number of selections is used as the priority. Criteria for regarding an option as low-ranked are the same as those described in the preceding criterion.

The options that appear in many groups are regarded to be important by the simple addition, and the effect of the actual number of selections is incorporated by multiplying the selection rate to the total number of selections.

If there is an option in the input options that does not exist in the stored data, the option is positioned as a high priority option at the end of the options that are determined to have high priority.

In this manner, the chatbot system according to the first example embodiment can achieve the efficiency of dialogue by making options with higher priority easier to be selected and lowering or collapsing/excluding options with low priority.

Second Example Embodiment

Figure 12:
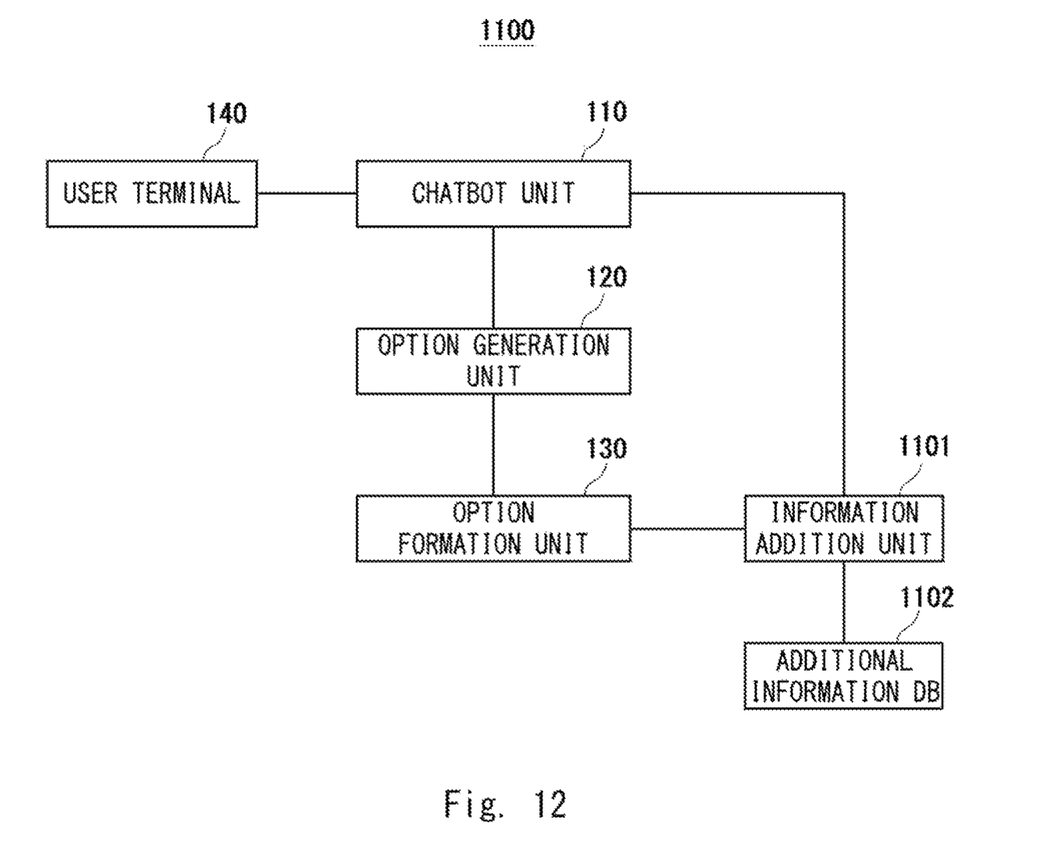
FIG. 12 is a block diagram showing a configuration of a chatbot system according to a second example embodiment.

In a second example embodiment, an example of adding information to options based on attribute information on a user is described. FIG. 12 is a block diagram showing a configuration of a chatbot system according to the second example embodiment. In FIG. 12, a chatbot system 1100 includes a chatbot unit 110, an option generation unit 120, an option formation unit 130, an information addition unit 1101, and an additional information DB 1102. In FIG. 12, the same components as in FIG. 1 are denoted by the same reference signs, and the description thereof is omitted.

The information addition unit 1101 refers to the additional information DB 1102 to add information to options sorted by the option formation unit 130. Then, the information addition unit 1101 transmits the sorted options with the added information to the chatbot unit 110.

The additional information DB 1102 is a database that stores a user's attribute in association with information to be added to the options.

Figure 13:
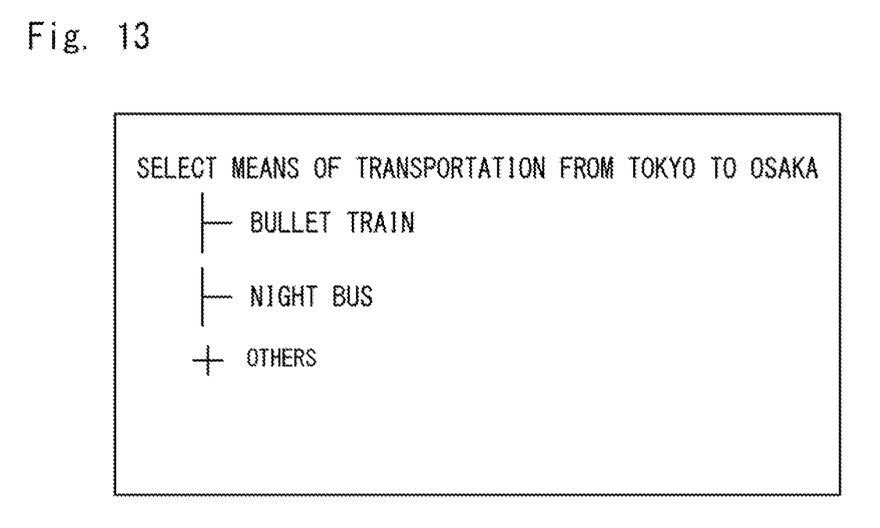
FIG. 13 is a diagram showing a display example in the chatbot system according to the second example embodiment.

This additional information may be information to delete options that are not displayed according to the user's attribute. FIG. 13 shows a display example in the chatbot system according to the second example embodiment. FIG. 13 shows an example in which the option "Airplane" cannot be selected from the options shown in FIG. 5 due to the user's attribute (for example, the user's organization). The information addition unit 1101 refers to the additional information DB 1102 and determines that the option "Airplane" cannot be selected due to the user's attribute (the user's organization). Then, the information addition unit 1101 deletes "Airplane" from the options and then transmits the options to the chatbot unit 110.

The additional information may vary depending on the user's attribute.

Figure 14:
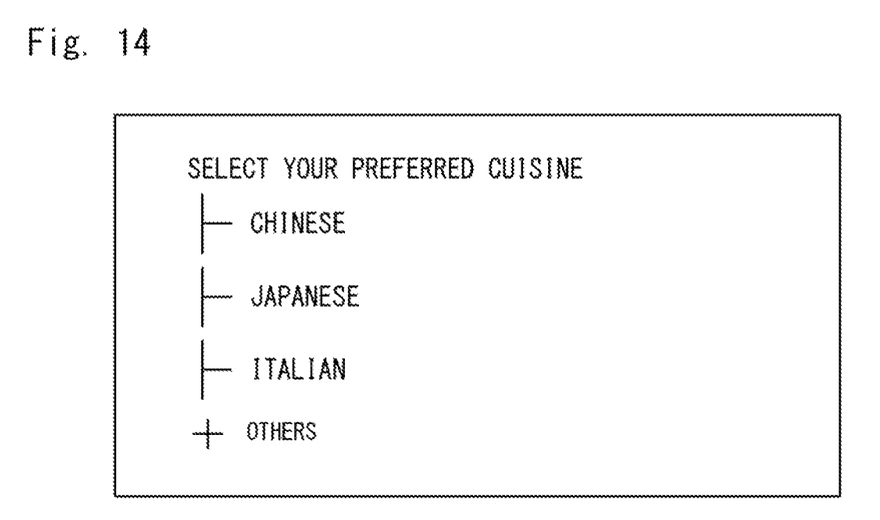
FIG. 14 is a diagram showing a display example in the chatbot system according to the second example embodiment.

FIG. 14 shows a display example in the chatbot system according to the second example embodiment. FIG. 14 shows display content before information is added. To the options in the display content in FIG. 14, different information is to be added depending on the user's attribute (for example, age).

Figure 15:
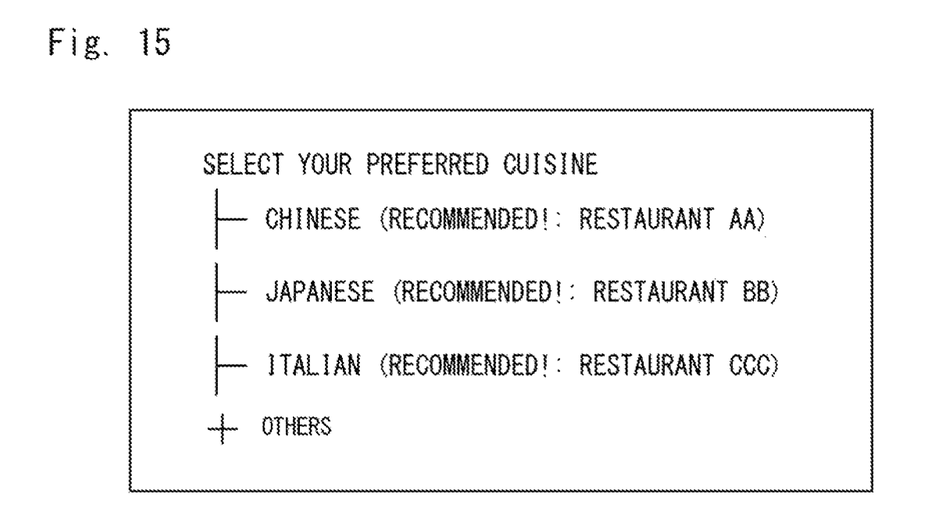
FIG. 15 is a diagram showing a display example in the chatbot system according to the second example embodiment.

FIG. 15 shows a display example in the chatbot system according to the second example embodiment. FIG. 15 is the display example with additional information when the age is higher than a predetermined value. In FIG. 15, the (Recommended!: Restaurant AA) indication is added to the Chinese cuisine option. Similarly, the (Recommended!: Restaurant BB) indication is added to the Japanese cuisine option. In addition, the (Recommended!: Restaurant CCC) indication is added to the Italian cuisine option.

Figure 16:
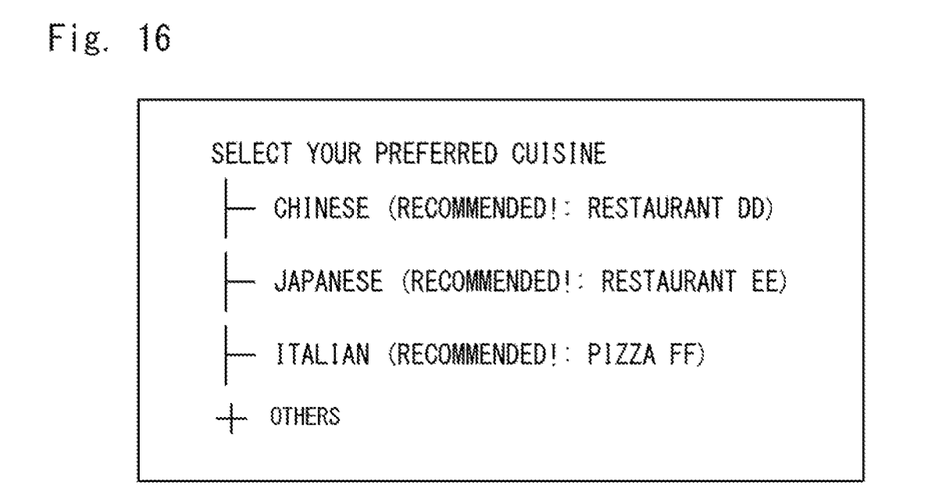
FIG. 16 is a diagram showing a display example in the chatbot system according to the second example embodiment.

FIG. 16 is a display example with additional information when the age is lower than or equal to the predetermined value. In FIG. 16, the (Recommended!: Restaurant DD) indication is added to the Chinese cuisine option. Similarly, the (Recommended!: Restaurant EE) indication is added to the Japanese cuisine option. In addition, the (Recommended!: Pizza FF) indication is added to the Italian cuisine option.

In this manner, the additional information is stored in the additional information DB 1102 for each option and user attribute.

Note that, additional information may be controlled in such a manner that the previously selected information is displayed preferentially.

In this manner, the chatbot system according to the second example embodiment can control options and add information according to the user's characteristics when the chatbot system can acquire attribute information on the user.

The present invention has been described with the above example embodiments, but is not limited by the above example embodiments. Various modifications that can be understood by those skilled in the art can be made to the configurations and the details of the present invention without departing from the scope of the invention.

In the above example embodiments, the present invention is described as a hardware configuration, but the present invention is not limited thereto. The present invention can realize arbitrary processing by making a central processing unit (CPU) execute a computer program.

The program can be stored by various types of non-transitory computer-readable media and provided to a computer. Non-transitory computer-readable media include various types of tangible storage media. Examples of non-transitory computer-readable media include magnetic storage media (such as flexible disks, magnetic tapes, and hard disk drives), optical magnetic storage media (such as magneto-optical disks), CD-Read Only Memory (CD-ROM), CD-R, CD-R/W, and semiconductor memories (such as mask ROM, Programmable ROM (PROM), Erasable PROM (EPROM), flash ROM, and Random Access Memory (RAM)). The program may be provided to a computer using various types of transitory computer-readable media. Examples of transitory computer-readable media include electric signals, optical signals, and electromagnetic waves. Transitory computer-readable media can provide the program to a computer through a wired communication line (such as electric wires, and optical fibers) or a wireless communication line.

REFERENCE SIGNS LIST

100 Chatbot system
110 Chatbot unit
111 User interface unit
112 Input text analysis unit
113 Network interface unit
120 Option generation unit
130 Option formation unit
131 Interface unit
132 Option priority determination unit
133 Selection behavior DB
134 Option sorting unit
135 Entailment clustering unit
136 Option recording unit
140 User terminal 1101 Information addition unit
1102 Additional information DB

What is claimed is:

1. A chatbot system comprising at least one memory storing instructions, and at least one processor configured to execute the instructions to:
 receive data on an inquiry from a user terminal;
 create options for a response to inquiry contents of the inquiry;
 sort the options in accordance with an order of priority;
 delete one or more options indicated by information from among the sorted options by referring to an additional information database storing the information in association with an organization to which a user belongs and indicating the one or more options not to be displayed according to the organization to which the user belongs; and
 transmit data for displaying the sorted options from which the one or more options indicated by the information have been deleted in the order of priority to the user terminal.

2. The chatbot system according to claim 1, wherein the at least one processor is further configured to execute the instructions to:
 record the order of priority of options for each of the inquiry contents in a selection behavior database;
 refer to the selection behavior database to determine a priority of each of the options; and
 sort the options based on the determined priority of each of the options.

3. The chatbot system according to claim 2, wherein the at least one processor is further configured to execute the instructions to:
 for each of the inquiry contents, record options selected in the past as high priority options in the selection behavior database, and options not selected in the past as low priority options in the selection behavior database.

4. The chatbot system according to claim 2, wherein the at least one processor is further configured to execute the instructions to:
 group phrases with similar meanings in the selection behavior database.

5. An option formation device comprising at least one memory storing instructions, and at least one processor configured to execute the instructions to:
 record an order of priority of options for each of inquiry contents in a selection behavior database;
 refer to the selection behavior database to determine a priority of each of the options;
 sort the options based on the determined priority of each of the options; and
 delete one or more options indicated by information from among the sorted options by referring to an additional information database storing the information in association with an organization to which a user belongs and indicating the one or more options not to be displayed according to the organization to which the user belongs.

6. The option formation device according to claim 5, wherein the at least one processor is further configured to execute the instructions to:
 for each of the inquiry contents, record options selected in the past as high priority options in the selection behavior database and options not selected in the past as low priority options in the selection behavior database.

7. The option formation device according to claim 5, wherein the at least one processor is further configured to execute the instructions to:
 group phrases with similar meanings in the selection behavior database.

8. An option formation method performed by a computer and comprising:
 referring to a selection behavior database to determine, for options for a response to an inquiry sent to a chatbot, a priority of each of the options;
 sorting the options based on the determined priority of each of the options;
 deleting one or more options indicated by information from among the sorted options by referring to an additional information database storing the information in association with an organization to which a user belongs and indicating the one or more options not to be displayed according to the organization to which the user belongs; and
 returning the sorted options from which the one or more options indicated by the information have been deleted to the chatbot.

9. The option formation method according to claim 8, further comprising recording, for each of inquiry contents, options selected in the past as high priority options in the selection behavior database and options not selected in the past as low priority options in the selection behavior database, or grouping phrases with similar meanings in the selection behavior database.

* * * * *